United States Patent [19]
Reynolds

[11] Patent Number: 5,851,151
[45] Date of Patent: Dec. 22, 1998

[54] PINLESS IMPACT UNIVERSAL JOINT

[75] Inventor: Ronald W. Reynolds, Carrollton, Tex.

[73] Assignee: Stanley Mechanics Tools, Carollton, Tex.

[21] Appl. No.: 822,914

[22] Filed: Mar. 21, 1997

Related U.S. Application Data

[63] Continuation of Ser. No. 409,314, Mar. 23, 1995, abandoned.

[51] Int. Cl.$^6$ ..................................................... F16D 3/00
[52] U.S. Cl. ........................................... 464/106; 403/138
[58] Field of Search ............................ 464/89, 106, 158, 464/159, 185, 906; 403/136, 137, 138, 122, 144; 81/177.5

[56] References Cited

U.S. PATENT DOCUMENTS

| | | | |
|---|---|---|---|
| 2,426,358 | 8/1947 | Klages et al. | 406/136 |
| 3,220,755 | 11/1965 | Gottschald et al. | 406/136 |
| 3,895,501 | 7/1975 | Holmes . | |
| 3,897,703 | 8/1975 | Phipps | 81/177.75 |
| 4,108,207 | 8/1978 | Lenker . | |
| 4,130,325 | 12/1978 | Schultenkamper . | |
| 4,188,801 | 2/1980 | Hugh et al. | 464/106 |
| 4,280,340 | 7/1981 | Goguet . | |
| 4,560,368 | 12/1985 | Sherman, II et al. . | |
| 4,582,503 | 4/1986 | Sherman, II . | |
| 4,695,227 | 9/1987 | Head et al. . | |
| 4,747,200 | 5/1988 | Olson, II . | |
| 4,749,299 | 6/1988 | Swanson | 403/138 X |
| 4,832,657 | 5/1989 | Hahn | 464/906 X |
| 4,875,787 | 10/1989 | Bauer et al. . | |
| 4,893,847 | 1/1990 | Hess . | |
| 4,936,701 | 6/1990 | Allen et al. | 81/177.75 X |
| 5,037,354 | 8/1991 | Shaff et al. | 464/106 X |
| 5,116,159 | 5/1992 | Kern, Jr. et al. | 406/137 X |

FOREIGN PATENT DOCUMENTS

| | | | |
|---|---|---|---|
| 3607827 | 1/1988 | Germany | 464/106 |
| 1125420 | 8/1968 | United Kingdom | 403/138 |
| 5562 | 9/1986 | WIPO | 464/106 |

*Primary Examiner*—Eileen Dunn Lillis
*Attorney, Agent, or Firm*—Gregory M. Howison

[57] ABSTRACT

The universal joint is provided for use with power drive tools. A driving member (12) is provided having a bore (16) at one end for receiving a drive member and a cavity (18) at the other end. A driven member (14) is provided having a quadrified ball (20) at one end and a socket receiving member (22) at the other end. The quadrified ball (20) has quadrified sides (40), a spherical head (42) and spherical corners (44). The quadrified side (40) contains sloped portions (46). The cavity (18) contains a base (54), a square cross-sectional area (48), radius corners (56) and a spring groove (66). The quadrified ball (20) is held in place in the cavity (18) by means of a "C" spring (68). The "C" spring (68) fits in spring groove (66). Disposed at the base (54) of the cavity (18) is a plug compression washer (60) made of a compressible polymer. Disposed between plug compression washer (60) and the head (42) of quadrified ball (20) is a plug tension washer (62). The plug tension washer (62) comprises a cylindrical disk with a frustroconical end and a planar end. The plug compression washer keeps pressure on the quadrified ball (20) against the "C" spring (68) such that the driven member (14) will remain at an angle at which it is placed. The plug tension washer (62) accepts the friction from the quadrified ball (40) as it rotates at its articulated angle.

23 Claims, 3 Drawing Sheets

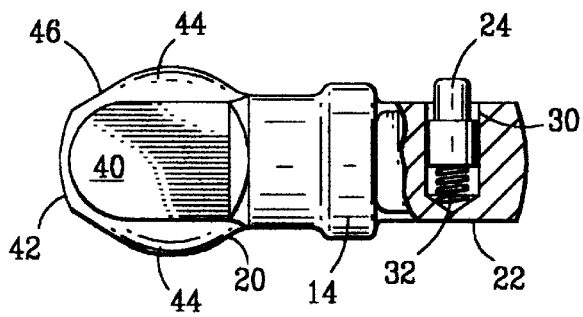
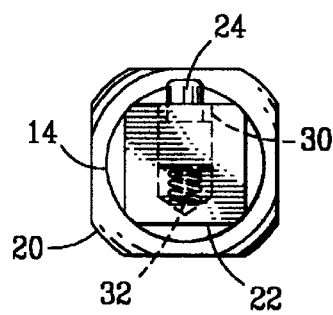
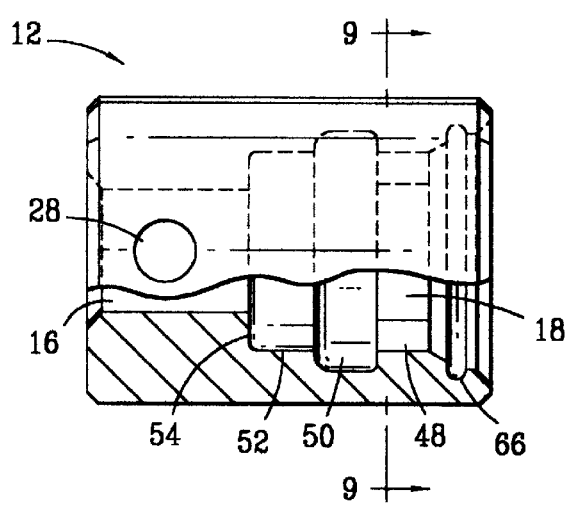
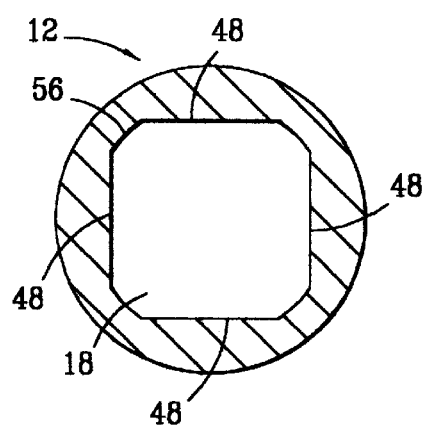

PINLESS IMPACT UNIVERSAL JOINT

This application is a Continuation, of application Ser. No. 08/409,314, filed Mar. 23, 1995 now abandoned.

TECHNICAL FIELD OF THE INVENTION

The present invention relates in general to a universal joint for transmission of torque from a tool and, more particularly, to a universal joint which uses polymers to act as a wear pad and to provide the required spring tension to the universal joint.

BACKGROUND OF THE INVENTION

The use of universal joints to tighten or loosen nuts or bolts by repeated blows rapidly applied by rotary-impacting means is well-known. Prior universal joints have either used a pin to hold the ball in the socket or have used a "C" spring retainer to hold the ball in a highly reinforced socket. After repeated uses, the pin retainer type of universal joint would fail. These failures consisted of the female end of the body cracking at the pin hole and also shearing of the pin. When the pin sheared or the female end of the body cracked, pieces of the universal joint would be thrown away from the universal joint at high speed, possibly causing damage to the operator. The end to the pin may break away or fracture. The pin also could fall out, or at least emerge partially from the coupling so as to weaken the torque transmitting action to the socket part. The universal joint could explode and, if the operator was looking at the universal joint or holding his hand around the universal joint, severe injury could occur.

After repeated uses, the universal joint using the reinforced female socket receiving body would gall. This would normally happen because the preload spring which preloads pressure between the ball head and the female receiving end would disintegrate under the high pressure and temperature and the bits and pieces from the disintegrated spring would cause the universal joint to gall or jam. If a universal joint was used without a reinforced female receiving end, the female receiving end would crack, just as in the pin type universal joint. Also, since the female receiving end had to be reinforced so strongly, it could not be placed on the same end as the female socket wrench receiving end. Since the reinforced female receiving end must be close to the socket receiving end, this does not allow as much room for the operator to work.

SUMMARY OF THE INVENTION

The present invention disclosed and claimed herein comprises a universal joint. The universal joint comprises a driving member having a drive piece receiving member at one end, and a ball receiving cavity at the other end. The universal joint also includes a driven member, having a ball member at one end and the ball member co-rotationally coupled with the ball receiving cavity. The ball member is held in the cavity by a "C" retaining spring. A fastening member engagement device is attached to the other end of the driving member. A tension washer is disposed between the base of the ball receiving cavity and the head of the ball member to reduce the friction between the head of the ball member and the base of the cavity. A compression washer is disposed between the base of the cavity and the tension washer and is operable to produce spring tension against the ball member, holding the ball member in place by pressing the ball member against the "C" retaining spring.

In another aspect of the present invention, the tension washer is of a cylindrical shape with a frustroconical end and a planar end.

In yet another aspect of the present invention, the tension washer is formed of a wear resistant polymer.

In a further aspect of the present invention, the compression washer is formed of a compressible polymer.

In a yet further aspect of the present invention, the compression washer is formed in a cylindrical shape with a plurality of holes disposed throughout the entire thickness of the compression washer.

BRIEF DESCRIPTION OF THE DRAWINGS

For a more complete understanding of the present invention and the advantages thereof, reference is now made to the following description taken in conjunction with the accompanying Drawings in which:

FIG. 4 illustrates a partially sectioned elevation view of the driven member;

FIG. 5 illustrates an end view of the driven member from the end of the socket receiving member;

FIG. 6 illustrates an end elevational view of the driven member from the end of the quadrified ball;

FIG. 7 illustrates a cross-sectional view taken along the line 7—7 in FIG. 6;

FIG. 8 illustrates a partially sectioned elevational view of the driving member;

FIG. 9 illustrates a cross-sectional view of the driving member taken along line 9—9 in FIG. 8;

DETAILED DESCRIPTION OF THE INVENTION

Figure 1:
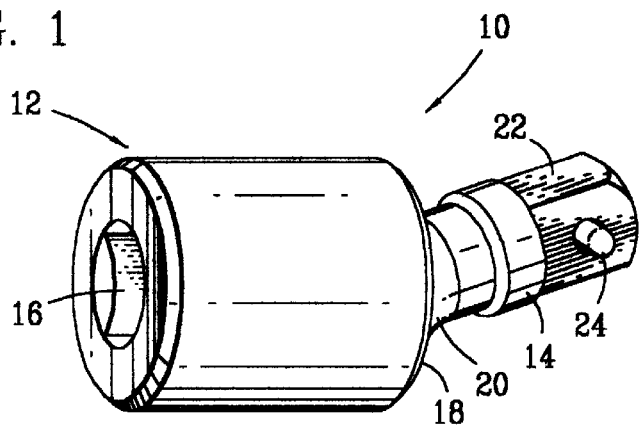
FIG. 1 illustrates a perspective diagram of the universal joint.

Referring now to FIG. 1, there is illustrated a perspective diagram of a universal joint 10. The universal joint 10 is comprised of a driving member 12 and a driven member 14. The driving member 12 and the driven member 14 are co-rotationally coupled to each other. The driving member 12 has a bore 16 in one end thereof. The bore 16 is used as a tool connecting device to receive a drive member (not shown). The bore 16 is suitable for receiving the square male drive member of a typical power tool or hand tool such as an impact wrench or ratchet wrench. In this case, the bore 16 is shaped as a female square drive member. The other side of the driving member 12 contains a cavity 18. The driven member 14 contains on one of its ends a quadrified ball 20. The quadrified ball 20 fits into the cavity 18 such that when the driving member 12 is rotated, the driven member 14 must rotate also.

On the opposite side of the driven member 14, a socket receiving member 22 is provided. The socket receiving member 22 is used to receive a socket or other fastening member engagement device so as to transfer the rotational movement from the driven member 14 to the fastening member engagement device and ultimately, to a fastener (not shown). The socket receiving member 22 is a conventional square male drive. The square male drive of socket receiving member 22 has four equal side faces and one top face. Located on one of the side faces of the socket receiving member 22 is a pellet detent 24. This is a conventional detent which is used to hold a socket or other fastening member engagement device in place on the socket receiving member 22. The driven member 14 may be angularly articulated with respect to the driving member 12. This allows universal pivotal movement of the driving member 12 with respect to the driven member 14, while preventing any rotational movement of the driving member 12 with respect to the driven member 14.

Figure 2:
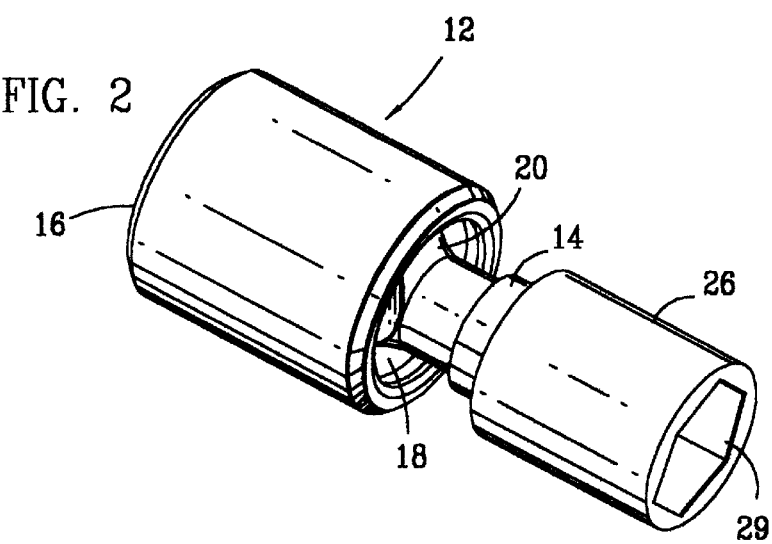
FIG. 2 illustrates a perspective view of an alternate embodiment of the system of the preset invention.

Referring now to FIG. 2, there is illustrated a perspective view of an alternate embodiment of the system of the present invention. The apparatus in FIG. 2 is mechanically identical to that in FIG. 1, except for the differences herein stated. The driving member 12 is shown having the bore 16 at one end and the cavity 18 at the other. The driven member 14 is shown having the quadrified ball 20 at one end. In this embodiment of the invention, instead of having a socket receiving member 22, as shown with reference to FIG. 1, the other side of the driven member 14 contains a socket part 26. The socket part 26 has an appropriately shaped socket 29 for engaging a nut or a head of a bolt. The socket part 26 may be formed into any shape for receiving and transmitting rotational force to any type of fastener which fastens using rotational movement.

Figure 3:
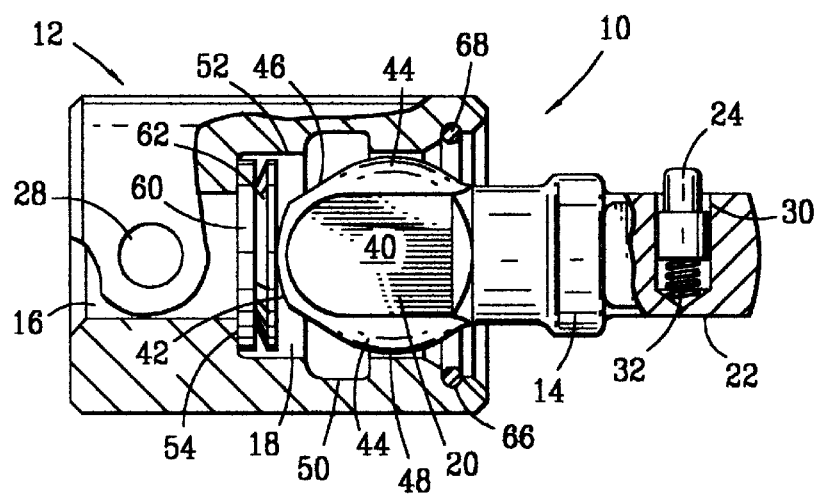
FIG. 3 illustrates a partially sectioned elevation view of the universal joint.

Referring now to FIG. 3, there is illustrated a partially sectioned elevational view of the first embodiment of universal joint 10. The driving member 12 is shown with the cavity 18 contained inside the driving member 12. The bore 16 is shown at the opposite end of the driving member 12. The cavity 18 is square-sided with broadly radiused corners. The bottom of cavity 18 narrows and becomes bore 16, which protrudes through the opposite end of driving member 12. A detent receiving bore 28 is provided through the wall of driving member 12 through to bore 16. This detent receiving bore 28 is used to receive a detent on a drive member (not shown).

The quadrified ball 20 is shown disposed in cavity 18. The quadrified ball 20 is a quadrified sphere with four equal sides 40, each of which is radiused and sloped in a longitudinal plane and straight in a transverse plane. A sloped portion 46 of each side 40 is tangent to the radius at a 33° angle from the axis. This can be varied and manufactured as angle articulation requirements are varied. The sides of the quadrified ball 20 are non-intersecting and are equi-angular with respect to each other. The quadrified ball 20 has spherical corners 44. A head 42 of the quadrified ball 20 is spherical as are the corners 44 between the four sides 40.

A cylindrical bottom 52 is formed at the bottom portion of cavity 18. A square cross-sectional area 48 is provided along the sides of cavity 18 for interfacing with the sides 40 of ball 20. The cavity 18 is provided with a circular undercut 50 as a transition between the square cross-sectional area 48 and the cylindrical bottom 52 of the cavity 18. A base 54 of cavity 18 is formed by the transition from the larger diameter cavity 18 to the smaller diameter bore 16.

A plug compression washer 60 is placed at the bottom of cavity 18, resting on the base 54 of cavity 18. The diameter of the plug compression washer is slightly smaller than the diameter of the cylindrical bottom 52 of cavity 18. The plug compression washer 60 is made out of a compressible material and shaped as a disk. The compression washer 60 may have holes passing through its height, causing the compression index of the compression washer 60 to change. A plug tension washer 62 is placed above the plug tension washer 62. Plug compression washer 60 comprises a cylindrical disk with a frustroconical and a planar end. The bottom of the plug tension washer 62 contacts the plug compression washer 60. The top of the plug tension washer 62 contacts the head 42 of the quadrified ball 20 of the driven member 14.

A spring groove 66 is disposed around the inside of cavity 18 near the top of cavity 18. Once the quadrified ball 20 is inserted into cavity 18, a "C" spring 68 is disposed in spring groove 66 such that the quadrified ball 20 is held in cavity 18. The inside diameter of the "C" spring 68 is slightly less than the outside diameter of quadrified ball 20. The plug compression washer 60 keeps the quadrified ball 20 pressed against "C" spring 68, such that the driving member 14 will be held at any angle at which it is positioned.

The pellet detent 24 is shown in detent bore 30. At the bottom of detent bore 30 a detent spring 32 is disposed. Detent spring 32 allows pellet detent 24 to be pressed downward such that the top of pellet detent 24 is flush with the side of the socket receiving member 22. The detent spring 32 then presses the pellet detent 24 into a detent receiving bore or groove in a socket member (not shown).

Referring now to FIG. 4, there is illustrated a partially sectioned elevation view of the driven member 14. The socket receiving member 22 is shown having detent bore 30 disposed in it. Pellet detent 24 is shown located inside the detent bore 30. Detent spring 32 is shown placed between pellet detent 24 and the base of detent bore 30. The quadrified ball 20 is shown having its quadrified sides 40. The spherical corners 44 and head 42 are also shown. The sloped portion 46 of each quadrified side 40 is shown having an angle of 33° tangent to the radius from the axis. The head 42 is rounded, as are the spherical corners 44. The driven member 14 is made of a hardened steel, AISI S7 Tool Steel.

Referring now to FIG. 5, there is illustrated an end view of the driven member 14 from the end of the socket receiving member 22. The driven member 14 is shown. The socket receiving member 22 is shown having four square sides and a square front. The detent bore 30 is shown passing into the socket receiving member 22. The detent spring 32 is shown holding the pellet detent 24 in place.

Referring now to FIG. 6, there is illustrated an end elevational view of the driven member 14 from the end of the quadrified ball 20. Quadrified ball 20 is shown having quadrified sides 40 with their sloped portions 46. The spherical corners 44 are shown between each of the quadrified sides 40. The head 42 is also shown.

Referring now to FIG. 7, there is illustrated a cross-sectional view taken along the line 7—7 in FIG. 6. The cross-section of the quadrified ball 20 is shown. The circular sides indicate the spherical corners 44 and the circular end indicates the head 42.

Referring now to FIG. 8, there is illustrated a partially sectioned elevated view of the driving member 12. The bore 16 is shown containing the detent receiving bore 28. Cavity 18 is shown on the opposite side of driving member 12. Spring groove 66 is shown near the opening of cavity 18 running along the full diameter of cavity 18. Next, the square cross-sectional area 48 is shown just beneath the spring groove 66. The circular undercut 50 is shown just under the square cross-sectional area 48. The square cross-sectional area 48 is located along the side of cavity 18 between spring groove 66 and circular undercut 50. The cylindrical bottom 52 of cavity 18 is shown creating the transition from cavity 18 to bore 16.

Referring now to FIG. 9, there is illustrated a cross-sectional view of driving member 12 taken along line 9—9 in FIG. 8. The driving member 12 is shown surrounding cavity 18. The sides of the square cross-sectional area 48 are indicated. Radiused corners 56 are shown connecting the sides of the square cross-sectional area 48. The flat sides of the square cross-sectional area 48 correspond to the quadrified sides of ball 20. The driving member 12 is also made of a hardened steel, AISI S7 Tool Steel.

Figure 10:
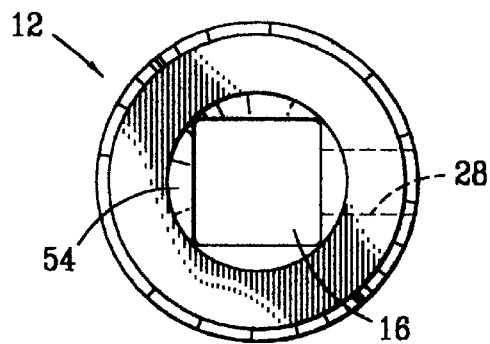
FIG. 10 illustrates an end view of the driving member.

Referring now to FIG. 10, there is illustrated an end view of the driving member 12. The bore 16 is shown running through the middle of driving member 12. The sides of the bore 16 are square and form a square female drive. The opposite side of base 54 of cavity 18 is also shown. The location of detent receiving bore 28 is shown in phantom.

Figure 11:
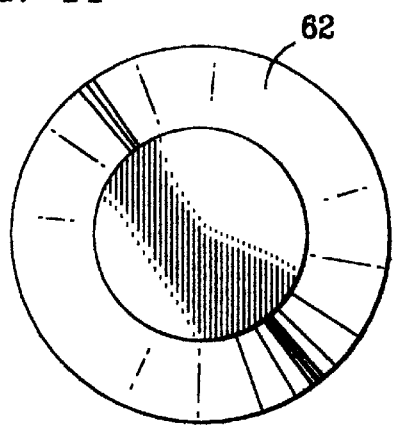
FIG. 11 illustrates a top view of the plug tension washer.

Referring now to FIG. 11, there is illustrated a top view of the plug tension washer 62. The plug tension washer 62 is comprised of a polymer manufactured under the trade name Novatine, supplied by Texas Rubber Supply, Inc., Oriental Gasket and Packing Company. The polymer of which the tension washer 62 is made is very resistant to wear and abrasion. The plug tension washer 62 comprises a cylindrical disk.

Figure 12:
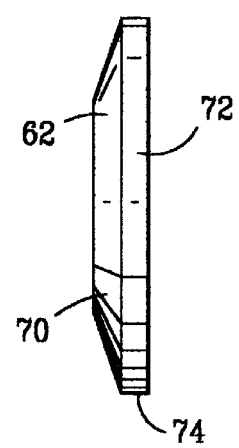
FIG. 12 illustrates a side elevational view of the plug tension washer.

Referring now to FIG. 12, there is illustrated a side view of the plug tension washer 62. The tension washer 62 is approximately ⅛ inch thick and ⅘ inch wide. The tension washer 62 comprises a planar end 72 and a frustroconical end 70. The planar end 72 has annular sides 74. The frustroconical end 70 begins at the top of the planar end 72 and slopes at an angle of approximately 20°.

Figure 13:
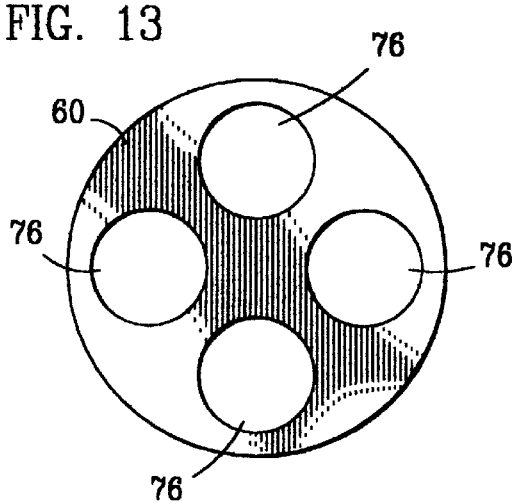
FIG. 13 illustrates a top view of the plug compression washer.

Referring now to FIG. 13, there is illustrated a top view of the plug compression washer 60. Plug compression washer 60 is formed using ⅛ inch thick polymer manufactured under the trade name BUNA-N, 40 DUROMETER, SHORE A, supplied by Texas Rubber Supply, Inc., Oriental Gasket and Packing Company. The plug compression washer 60 comprises a disk having four equally spaced holes 76. The holes may be varied in size to change the compression index of the plug compression washer 60. The holes 76 penetrate through the full depth of the plug compression washer 60.

Figure 14:
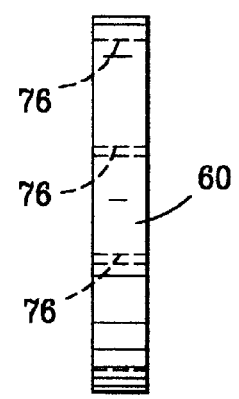
FIG. 14 illustrates a side elevational view of the plug compression washer.

Referring now to FIG. 14, there is illustrated a side elevational view of the plug compression washer 60. The location of the equally spaced holes 76 are also shown. The compression washer is approximately ⅛ inch thick and ⅘ inch wide. The greater the volume removed from the compression washer 60 through formation of the holes 76, the greater the compression washer 60 will compress for a given amount of force applied.

In operation, the universal joint 10 is connected to a drive member. The drive member is connected to the bore 16 of driving member 12. The drive member may be any typical hand or power tool, such as an impact wrench or a ratchet wrench. The drive member normally has a conventional square male drive which fits into bore 16, which is in the form of a conventional female drive. Since the bore 16 is square, thereby constituting a female drive, any torque applied by the drive member will be transferred to the driving member 12. The socket receiving member 22 is used to receive a socket for the fastening member engagement device.

In FIG. 1, the socket receiving member 22 is shaped as a conventional square male drive. Socket receiving member 22 is used to receive a conventional female drive of a socket or other device used to transfer torque to a fastener. Located on one side face of the square male drive of the socket receiving member 22 is the pellet detent 24. The pellet detent 24 holds a socket or other device on the socket receiving member 22. This is done by using the detent spring 32 positioned under pellet detent 24 to press pellet detent 24 into a hole or groove located in the socket member.

In FIG. 2, the socket part 26 is attached directly to driven member 14. The socket part 26 contains the socket 29 which is appropriately shaped for engaging a nut or the head of a bolt. The socket part 26 may be formed into any shape for receiving and transmitting rotational force to any of a number of types of fasteners which require rotational movement.

As shown in FIG. 3, the plug compression washer 60 and the plug tension washer 62 are placed in the base 54 of the cylindrical bottom 52 of the cavity 18 of driving member 12. The plug compression washer 60 is held in place by the base 54 of cylindrical bottom 52, which is formed when the cylindrical bottom 52 is narrowed in diameter to form bore 16 on the opposite side of driving member 12. The detent receiving bore 28 is used to receive a pellet or ball detent from a drive member.

The quadrified ball 20 of driven member 14 fits into cavity 18 of driving member 12. The head 42 of quadrified ball 20 rests against the plug tension washer 62. The sloped portions 46 of quadrified sides 40 of ball 20 correspond to the circular undercut 50 of cavity 18. The square cross-sectional area 48 of cavity 18 corresponds to the quadrified sides 40 of ball 20.

When the driven member 14 is angled with respect to the driving member 12, the sloped portions 46 of sides 40 interact with the square cross-sectional area 48 of cavity 18. The "C" spring 68, when fitted in spring groove 66, holds the ball 20 of the driven member 14 in cavity 18, such that the head 42 of ball 20 is pressed snugly against plug tension washer 62. This allows the driven member 14 to be positioned at any available angle and remain positioned since the plug compression washer 60 is used to preload driven member 14. Since driven member 14 is preloaded through the force placed upon tension washer 62 and ball 20 by plug compression washer 60, the driven member 14 is able to retain alignment prior to operation and to prevent unnecessary lash during operation. The bore 16 allows deflection of plug compression washer 60 under extreme load conditions.

Once a socket is positioned on socket receiving member 22 and held in place by pellet detent 24, and a drive member is connected to bore 16 and held in place by receiving a detent in detent receiving bore 28, rotational force may be transmitted from the drive member to the socket member. The universal joint may be articulated up to an angle of 32°, thereby providing universal pivotal movement of one member with respect to the other, while preventing any rotational movement of such member with respect to the other. As the driving member 12 rotates, the ball 20 pivots inside cavity 18. The plug tension washer 62 accepts the rotational and pivotal friction from the head 42 of ball 20. Plug tension washer 62 will not heat up and disintegrate as a spring performing similar functions would under high impact and load conditions. This, in turn, keeps the cavity 18 free of debris and keeps universal joint 10 from galling. The plug compression washer 60 may provide as much compressibility as a spring, but also will not disintegrate under high loads of pressure conditions. The plug tension washer 62 is also used to retain lubricant for the assembly, as well as to act as a wear pad for the rotating head 42 of ball 20.

The fact that the driving member 12 and driven member 14 are made of AISI S7 Tool Steel causes the driving member 12 and the driven member 14 to be less likely to crack under loads. The AISI S7 Tool Steel is an extremely hard steel which, when used in connection with the plug compression washer and plug tension washer instead of a conventional spring, can cause the universal joint 10 to operate without galling for a much longer time than a conventional universal joint.

In summary, there has been provided a universal joint for power drive tools. A driving member is provided having a bore at one end for receiving a drive member and a cavity at the other end. A driven member is provided having a quadrified ball at one end and a socket receiving member at the other end. A quadrified ball has quadrified sides, a spherical head and spherical corners. A quadrified side contains sloped portions 46. The cavity contains a base, a cross-sectional area, radiused corners and a spring groove. A quadrified ball is held in place in the cavity by means of a "C" spring. The "C" spring fits into a spring groove. Disposed at the base of the cavity is a plug compression washer made of a compressible polymer. Disposed between a plug compression washer and the head of the quadrified ball, is a plug tension washer. The plug tension washer comprises a cylindrical disk with a frustroconical and a planar end. The plug compression washer keeps pressure on the quadrified ball against the "C" spring, such that driven member 14 will remain at an angle at which it is placed. The plate tension washer accepts friction from the head of a quadrified ball as it rotates at its articulated angle.

Although the preferred embodiment has been described in detail, it should be understood that various changes, substitutions and alterations can be made therein without departing from the spirit and scope of the invention as defined by the appended claims.

What is claimed is:

1. A universal joint for use with an impact wrench to co-rotationally couple a driver to a fastener member for transferring impact-type rotational forces therebetween, the universal joint comprising:

a driving member having first and second ends, and having a driver receiving member disposed at said first end for engaging a drive piece of the driver, and further having a ball member receiving cavity having a base disposed at said second end;

a driven member having first and a second ends, and having a ball member disposed at said first end;

said ball member having a head and said ball member disposed in said ball receiving cavity and co-rotationally coupled with said ball receiving cavity for transferring rotational forces therebetween;

a polymer member having a first portion with a wear resistant surface disposed adjacent to said head of said ball member, and a second resilient portion disposed between said first portion and said base of said ball receiving cavity wherein said polymer member exerts a preload force against said head of said ball member in response to being compressed between said head of said ball member and said base of said cavity; and an engagement device disposed on said second end of said driven member for engaging a fastening member.

2. The universal joint of claim 1, wherein said first portion of said polymer member comprises a tension washer disposed directly adjacent to said head of said ball member.

3. The universal joint of claim 2, wherein said tension washer is of a cylindrical shape with a planar end and a frustroconical end.

4. The universal joint of claim 2, wherein said tension washer is formed of a wear resistant polymer.

5. The universal joint of claim 1, wherein said ball member is retained in place in said ball receiving cavity by means of a "C" retaining spring that comprises said fastening member.

6. The universal joint of claim 1, wherein said second portion of said polymer member comprises a compression washer disposed between said base of said ball receiving cavity and said first portion of said polymer member, said compression washer being operable to compress with a compression index which is selected for both absorbing the impact loads and for providing said preload force to said ball member to hold said ball member in a chosen position in said cavity by pressing said ball member against a "C" retaining spring when at rest.

7. The universal joint of claim 6, wherein said compression washer is formed of a compressible polymer, and is formed to selectively determine said compression index.

8. The universal joint of claim 6, wherein said compression washer is disk-shaped and further comprises a plurality of holes, which are sized to select said compression index and which extend through the entire thickness of said compression washer to determine the compression index of said compression washer.

9. The universal joint of claim 1, wherein said driving member and said driven member are formed of a hardened material.

10. The universal joint of claim 9, wherein said hardened material comprises AISI S7 Tool Steel.

11. The universal joint of claim 1, wherein said ball receiving cavity has a square cross-sectional area with straight sides and wherein said ball member has sloped, quadrified sides with radiused corners and said quadrified sides co-act with said straight sides of said square cross-sectional area of said receiving cavity.

12. The universal joint of claim 11, wherein said sloped, quadrified sides of said ball member are sloped in a longitudinal plane and straight in a transverse plane to the axis of said ball member.

13. The universal joint of claim 11, wherein said sloped portion of said sloped and quadrified sides are sloped at approximately 33° to the longitudinal axis of said ball member.

14. A universal joint, for use with an impact wrench to co-rotationally couple a driver to a fastener member for transferring impact-type rotational forces therebetween, the universal joint comprising:

a driven member having first and second ends, with one of a ball member and a ball receiving cavity disposed at said first end;

a driving member having first and a second ends, with a ball member disposed at said first end, and said driving member further having a driver receiving member disposed at said second end for engaging a drive piece of a driver;

said ball receiving cavity having a base;

said ball member having a head which is disposed in said ball receiving cavity and co-rotationally coupled with said ball receiving cavity for transferring rotational forces therebetween;

a compression washer formed of a resilient polymer material, said compression washer disposed between said head of said ball member and said base of said cavity, adjacent to said base of said cavity;

a tension washer formed of a wear resistant polymer material disposed between said head of said ball member and said compression washer, adjacent to said head of said ball member;

wherein said compression washer, in response to being pressed inward toward said base of said cavity, exerts a preload force against said tension washer and the head of said ball member; and an engagement device disposed on said second end of said driven member for engaging a fastening member.

15. A method for transferring impact-type rotational forces into a driving member, through an angle and then to a driven member, the method comprising the steps of:

rotating the driving member, having first and second ends and having a driver receiving member disposed at the first end and a ball receiving cavity having a base disposed at the second end, using a driver;

rotating the driven member, having first and second ends and having a ball member disposed at the first end, the ball member having a head and the ball member disposed in the ball receiving cavity, the ball member co-rotationally coupled with the ball receiving cavity, the driven member being driven by the driving member;

disposing a polymer member having a first portion with a wear resistant surface disposed directly adjacent to the head of the ball member, and disposing a second resilient portion between the first portion and the base of cavity;

exerting a preload force against the head of the ball member in response to the polymer member being disposed between the head of the ball member and the base of the cavity, and being compressed therebetween, wherein the polymer member presses the wear resistant surface of the first portion against the head of the ball member; and rotating a fastener using a fastening member engagement device disposed on the second end of the driven member.

16. The method of claim 15, wherein the wear resistant polymeric surface of the first portion is provided by a tension washer disposed between the base of the ball receiving cavity and the head of the ball member, directly adjacent to the head of the ball member.

17. The method of claim 15, and further comprising the step of retaining the ball member in place in the ball receiving cavity by means of a "C" retaining spring as the fastening member.

18. The method of claim 15, wherein the driving member and the driven member are formed of a hardened material.

19. The method of claim 18, wherein the hardened material comprises AISI S7 Tool Steel.

20. The method of claim 15, wherein the ball receiving cavity has a square cross-sectional area with straight sides, the ball member has quadrified sides with radiused corners, and the quadrified sides are sloped and co-act with the straight sides of the square cross-sectional area of the receiving cavity.

21. The method of claim 20, wherein the sloped and radiused side of the ball members are radiused in a longitudinal plane and straight in a transverse plane to the axis of the ball member.

22. The method of claim 21, wherein the sloped portion of the sloped and quadrified sides are sloped at approximately 33° to the longitudinal axis of the ball member.

23. A method for transferring impact-type rotational forces into a driving member, through an angle and to a driven member, the method comprising the steps of:

providing a driving member and a driven member, one having a ball receiving cavity and the other having a ball member for disposing within the cavity to co-rotationally couple the driving and the driven members together for transferring rotational forces therebetween, and further providing a polymer member, the polymer member having a first portion with a wear resistant surface adjacent the ball member and a second portion between the first portion and the base of the ball receiving cavity;

co-rotationally coupling the driving and the driven members together, with the ball member disposed within the ball receiving cavity for transferring the rotational forces therebetween, and the polymer member being disposed in the cavity inward of the ball member, between the driving and the driven members, and adjacent to the base of the ball receiving cavity;

angularly displacing the driving member relative to the driver member, to dispose the driven member at the angle relative to the driving member;

rotating the driving member to co-rotate and transfer the rotational forces to the driven member;

wherein co-rotating the driving member and the driven member, with the driven member disposed at the angle to the driving member, and transferring the rotational forces therebetween moves the ball member within the cavity and presses the ball member against the polymer member; and wherein the polymer member continuously applies preload forces toward the ball member in response to being squeezed between the ball and the base of the ball receiving cavity.

* * * * *